Figures 1, 2:
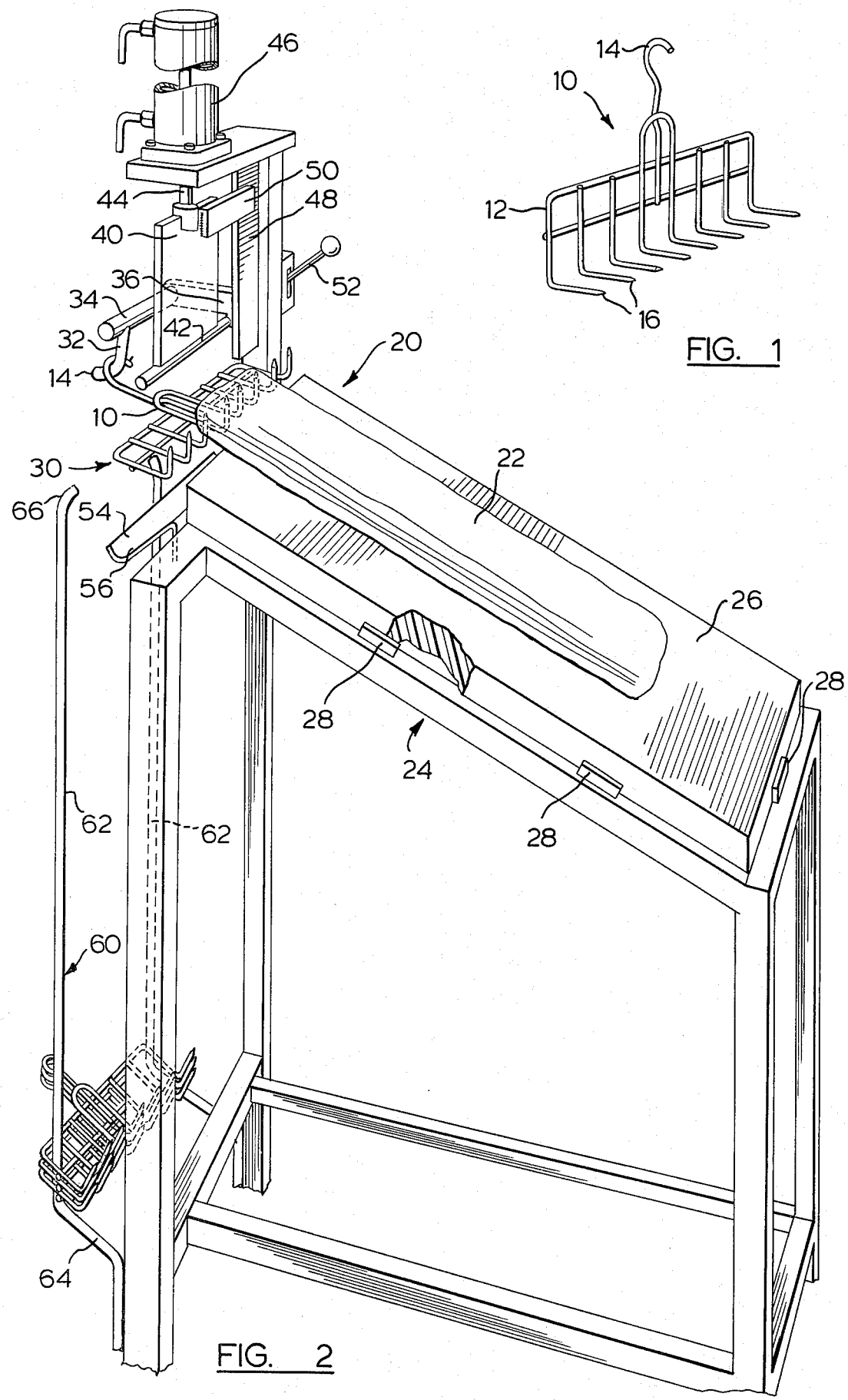

United States Patent [19]

Ilines

[11] 4,106,174
[45] Aug. 15, 1978

[54] DEVICE FOR REMOVING MEAT HANGERS FROM MEAT

[75] Inventor: Laurence James Ilines, Edmonton, Canada

[73] Assignee: C.A. Pemberton & Co. Limited, Toronto, Canada

[21] Appl. No.: 800,340

[22] Filed: May 25, 1977

[51] Int. Cl.² .............................................. B23P 19/04
[52] U.S. Cl. ...................................... 29/239; 29/252; 211/49 R
[58] Field of Search ................. 29/239, 252; 214/6 D; 211/49 R, 59.1, 125, 57.1

[56] References Cited

U.S. PATENT DOCUMENTS 3,376,626   4/1968   Anderson ............................... 29/252

*Primary Examiner*—James L. Jones, Jr.
*Attorney, Agent, or Firm*—Fetherstonhaugh & Co.

[57] ABSTRACT

A device for removing meat hangers from meat and a hanger storage stand are provided by this invention. The device for removing meat hangers comprises a frame having a stripping station, a first support on one side of the stripping station for supporting a hanger and a second support on the other side of the stripping station supporting a body of meat and a stripper plate mounted for movement with respect to the frame to extend into the stripping station between the first and second support as to engage the meat hanger and drive the needles out of the meat. The support stand includes guide rods for receiving hangers and guiding them to fall onto a base member which is angularly inclined with respect to the guide rods at an angle equal to half the included angle between the main body and the needles so that the hangers nest one within the other to form a compact stack of hangers.

10 Claims, 3 Drawing Figures

DEVICE FOR REMOVING MEAT HANGERS FROM MEAT

This invention relates to a device for removing meat hangers from meat such as bacon or the like.

In the processing of bacon bellies, bacon sides and jowls and the like, the meat is impaled on the needles of a bacon hanger or bacon comb which serves to support the meat during subsequent processing operations such as smoking and setting-up. Prior to the curing operation the meat hanger can be secured with respect to the meat without great difficulty because at this stage the meat is soft and readily penetrated. As a result of curing operations such as smoking and chilling of the meat prior to slicing, the meat becomes firmly secured to the hanger so that great difficulty is experienced in removing the hanger.

To date all attempts to remove bacon hangers or combs from cured and chilled meat employ a manual operation. The manual operation is time consuming and frequently results in damage to the hanger and the meat, and injury to the operator. In order to reduce the likelihood of such difficulties, some processing operations permit slight warming of the meat to take place, so that it becomes more pliable, before attempting the removal of the hanger. If the meat is allowed to become more pliable, difficulties can be experienced in attempting to slice the meat in a subsequent operation. Thus, while chilling of the meat is important to maintain the characteristic of the meat which facilitates slicing, the same freezing makes the removal of the hanger more difficult.

The difficulties of the prior art described above are overcome by the apparatus of the present invention which permits the mechanical removal of the hangers with minimum damage to the meat.

The device of the present invention is designed to remove the penetrating needles of the hanger in a direction opposite to the direction in which they extend into the meat so that the meat is not damaged by the removal of the needles.

According to one aspect of the present invention, there is provided a device for removing meat hangers from meat such as bacon or the like. The meat hangers which are removed consist of a body portion having a suspension hook at one end thereof and a plurality of meat penetrating needles at the other end thereof, the meat penetrating needles being inclined with respect to the body portion in a penetrating direction towards said suspension hook. The device for removing the hanger comprises, a frame having a stripping station located therein, first support means at a first side of said stripping station for supporting a hanger, second support means at a second side of said station opposite said first side for supporting said body of meat with said hanger extending across said stripping station with its needles oriented in a first direction with respect to said stripping station, stripper means mounted for movement with respect to said frame to extend into said stripping station between said first and second supports to engage said meat hanger and drive said needles in a second direction opposite said first direction to remove said needles from said meat in said second direction, and drive means for driving said stripper member with respect to said frame.

According to a further aspect of the present invention, the frame of the device has a hanger discharge passage opening rearwardly from said stripper station and a hanger stand comprising a base member, guide rod means projecting upwardly from said base member and having free ends disposed rearwardly from said discharge passage of said stripper station and aligned with passages in said hanger to be threaded through said passages when said hangers may be stacked one on top of the other on said hanger stand.

Figure 3:
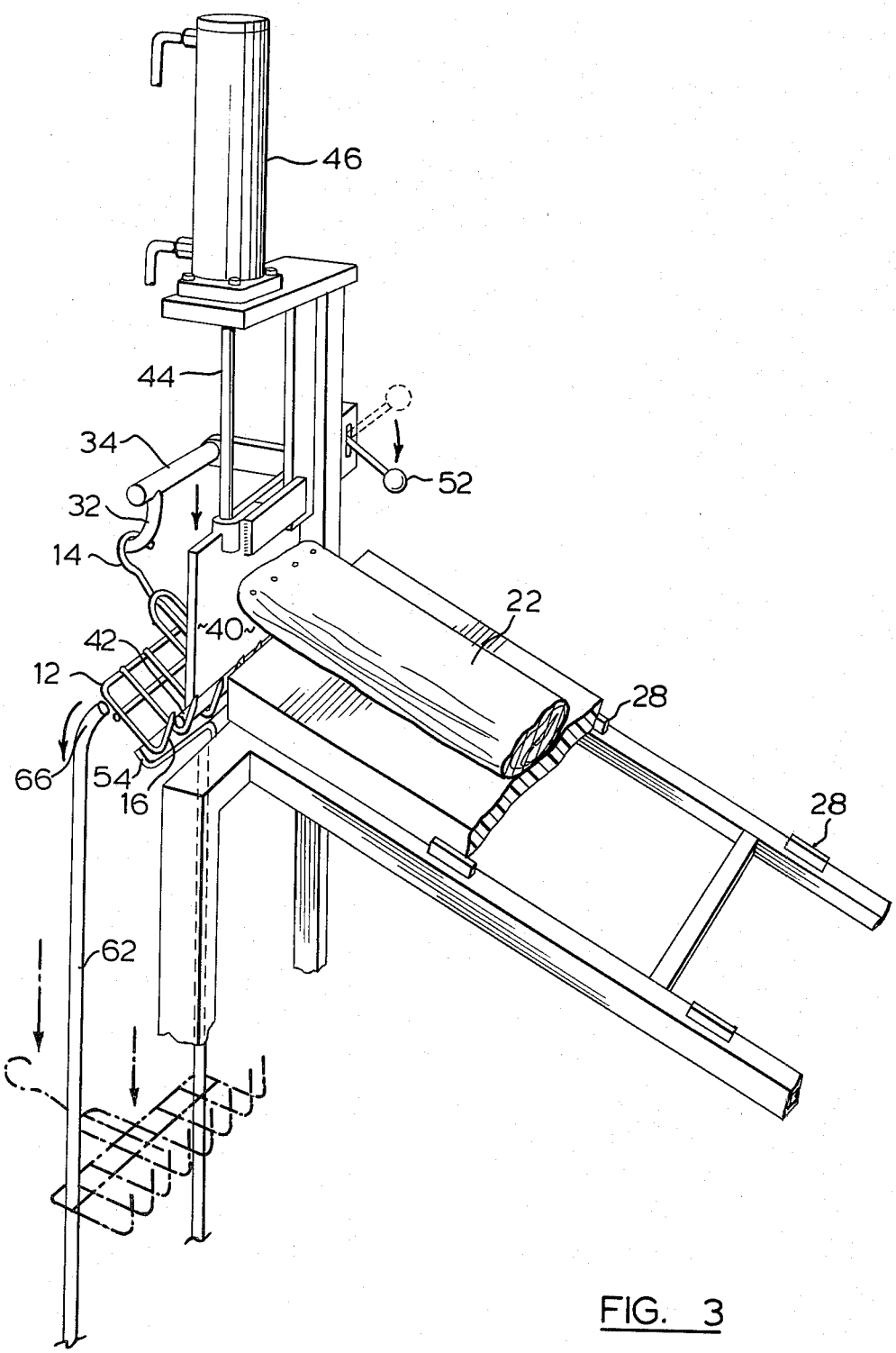

The invention will be more clearly understood with reference to the following detailed specification read in conjunction with the drawings, wherein FIG. 1 is a pictorial view of a meat hanger of a type which may be removed by the apparatus of the present invention;

FIG. 2 is a pictorial front view of the device for removing meat hangers according to an embodiment of the present invention; and FIG. 3 is a detailed view of the device of FIG. 1 showing the stripper plate in the lowered position.

With reference to FIG. 1 of the drawings, reference numeral 10 refers generally to a meat hanger or meat comb as it is commonly known of a type commonly used to support meat such as bacon bellies, bacon sides, jowls and cured meats of various types during curing and setting-up stages of a meat processing operation.

The hanger 10 is in the form of a stainless steel wire frame having a main body portion 12, suspension hook 14 and a plurality of penetrating needles 16. The needles are generally inclined at an angle of about 65° to the main body portion 12 so that the weight of the meat supported on the needles provides a load component which urges the meat towards the plane of the main body portion 12.

With reference to FIG. 2 of the drawings, the reference numeral 20 refers generally to a device for removing meat hangers 10 from a body of meat 22.

The device 20 comprises a frame, generally identified by the numeral 24, which supports a platform 26 in an angularly inclined plane. The platform 26 is preferably made from a block of plastics material which may be removed from time to time for cleaning and sterilization. The platform 26 is retained on the frame by a plurality of stop brackets 28. The platform 26 is preferably inclined with respect to the horizontal plane at an angle of about 25° so that when a body of meat is supported on the platform, as will be described hereinafter, the needles 16 extend in a substantially vertical plane.

The device 20 has a stripper station 30 located outwardly from the upper edge of the platform 26. A mounting finger 32 is secured to a support bar 34 which is in turn secured to an arm 36 which is mounted on the frame 24. The mounting finger 32 is located at one side of the stripping station 30 and provides a first support for supporting a hanger and the platform 26 is supported at the opposite side of the stripping station and supports a body of meat which is secured to the hanger. The stripper plate 40, which has a rounded nose portion 42 at the lower end thereof, is mounted on the shaft 44 of the double-acting cylinder 46. A guide rail 48 extends longitudinally of the frame and a pair of arms 50 project outwardly from the stripper plate 40 and are arranged one on either side of the guide rail 48. The arms 50 move along the guide rail 48 as the stripper plate is reciprocally driven by the cylinder 46 to maintain the stripper plate in a position extending parallel to the upper edge of the platform 26. The supply of air to the cylinder 46 to reciprocally drive the shaft 44 is controlled by a control valve having a control lever arm 52.

A stop plate 54 is mounted on the frame 28 in the stripping station directly below the stripper plate 40. The stop plate 54 is made from sheet metal and has a receiving channel 56 extending longitudinally thereof.

A hanger stand, generally identified by the reference numeral 60 is located below the stripper station. The hanger stand 60 consists of a frame which includes a pair of elongated arms 62 which extend upwardly from a base 64 and have their upper ends 66 located at the lower end of the stripper station 30. The base 64 is angularly inclined with respect to the vertical plane at an angle equal to half the included angle between the main body portion 12 and the needles 16 so that the hangers 10 may nest one within another when stacked as shown in FIG. 2. The nesting of the hangers which is achieved by the angularly inclination of the base 64 greatly increases the capacity of the support and makes the removal of hangers a simple operation.

In use, a body of meat with the hanger 10 attached thereto is positioned, as shown in FIG. 1 of the drawings, with the hook portion 14 of the hanger extending around the finger 32 and the body of meat 22 resting on the platform 26 so that the body portion of the hanger and the needles of the hanger are located in the stripper station 30. As previously indicated, the angle of inclination of the platform 26 is preferably such that when the hanger is located in the opposite position in the stripper station illustrated in FIG. 1, the needles 16 are substantially vertically oriented. The stripper plate 40 is also substantially vertically oriented and is positioned with the rounded nose portion 42 thereof aligned with the recessed channel 55 in the stop plate 54.

When the control lever 52 is moved to the position shown in FIG. 3 of the drawings, air is supplied to the cylinder 46 to drive the stripper plate 40 downwardly through the stripping station. As the stripper plate 40 moves downwardly, the nose portion 42 engages the main body portion 12 of the hanger and forces it downwardly to withdraw the needles 16 from the body of meat 22. The stripper plate 40 continues to move downwardly until the hanger is seated in the stop plate 54. During the stripping operation, the hook portion 14 of the hanger remains in contact with the finger 32. When the stripper plate is raised, the hook portion 14 of the hanger will be freed with respect to the finger 32 and the weight of the body of the hanger will cause the hanger to fall freely from the stop plate 54. The upper ends 66 of the arms 62 of the stand 60 are positioned to underlie passages in the frame 10 so that when the frame 10 falls under its own weight, the arms 62 are threaded through passages in the frame so that after the hangers have been removed they may be accumulated automatically upon the hanger stand.

From the foregoing it will be apparent that the apparatus of the present invention provides a simple and efficient device for removing meat hangers from a body of meat.

The device of the preferred embodiment has various features which contribute to its success and although all of these features are not necessarily essential to the invention, they do contribute significantly to the successful operation of the device.

For example, it will be apparent that the apparatus could operate with the support platform extending in a substantially horizontal plane. Nevertheless, the angular inclination of the support platform provides several distinct advantages. In particular, the angle of inclination of the platform 26 serves to present the needles 16 toward the stripper plate in a substantially vertical plane so that when the stripper plate moves downwardly and engages the hanger, the needles are withdrawn in a plane which is substantially vertical so that the needles are not torn through the body of the meat. In addition, the angle of inclination of the platform serves to locate the hanger in the required operative position by reason of the fact that the weight of the meat resting on the table has a component extending away from the support finger 32 so that the hanger hook 14 is drawn against the finger 32 by the weight of the assembly.

The finger 32 has an arcuate curvature extending rearwardly and downwardly from the stripper station. This curvature assists the removal of the needles in a substantially vertical plane as it permits the hook portion 14 to move freely along the finger 32. In addition, the finger 32 has a rounded outer end so that when the hanger is located in the position shown in FIG. 3 of the drawings, it will fall freely from the finger 32 when the stripper plate 40 is raised.

If the hanger stand 60 is not used, the finger 32 may be elongated in a direction away from the stripper station so that one or more hangers may be located on the finger 32.

While the stop plate 54 is not essential to the successful operation of the stripper mechanism, it does serve to control the motion of the hanger immediately following the removal of the needles. Without this stop plate, the hanger might be violently expelled from the apparatus after the fingers have been withdrawn from the meat.

These and other advantages of the apparatus of the present invention will be apparent to those skilled in the art.

What I claim as my invention is:

1. A device for removing meat hangers from meat such as bacon or the like, said meat hangers consisting of a body portion having a suspension hook at one end thereof and a plurality of meat penetrating needles at the other end thereof, the meat penetrating needles being inclined with respect to the body portion in a penetrating direction towards said suspension hook, said device comprising:

(a) a frame having a stripping station located therein,
   (b) first support means at a first side of said stripping station for supporting a hanger,
   (c) second support means at a second side of said station opposite said first side for supporting said body of meat with said hanger extending across said stripping station with its needles oriented in a first direction with respect to said stripping station,
   (d) stripper means mounted for movement with respect to said frame to extend into said stripping between said first and second supports to engage said meat hanger and drive said needles in a second direction opposite said first direction to remove said needles from said meat in said second direction,
   (e) drive means for driving said stripper member with respect to said frame.

2. A device as claimed in claim 1 wherein said second support means comprises a support platform having a support surface which is inclined downwardly away from said first support means whereby the meat is supported in an inclined plane and applies a load component along said inclined plane which serves to operatively locate its associated hanger in said stripping station.

3. A device as claimed in claim 1 wherein said stripper means is mounted to reciprocate into and out of said stripping station in a plane parallel to said first direction.

4. A device as claimed in claim 1 wherein said stripper means is mounted above said first and second support means and a stop member is located below said first and second support means, said stripper means being adapted to reciprocate into and out of said stripping station to drive said hanger downwardly towards said stop means, said stop means supporting said other end of said hanger after said needles have been stripped from the meat.

5. A device for removing meat hangers from meat such as bacon or the like, said meat hangers consisting of a body portion having a suspension hook at one end thereof and a plurality of meat penetrating needles at the other end thereof, the meat penetrating needles being inclined with respect to the body portion in a penetrating direction towards said suspension hook, said device comprising:
 (a) a frame having a stripping station located therein, a stripping path extending through said stripping station,
 (b) a platform mounted on said frame and having a front edge in said stripping station adjacent and at one side of said stripping path,
 (c) mounting means on said frame and spaced outwardly from said front edge of said platform on the opposite side of said stripping path, said mounting means being adapted to support a suspension hook of a hanger to locate a hanger in a first position in said station with its needles located in said stripping path and its associated meat resting on said platform,
 (d) a stripper member mounted for movement with respect to said frame to extend into said stripper station to engage a meat hanger and drive its associated needles along said stripper path and out of said meat,
 (e) drive means for driving said stripper member with respect to said frame.

6. A device as claimed in claim 5 wherein said support platform has a support surface which is inclined downwardly away from said first edge and said first support means such that the meat supported on said support surface applies a load component along said support surface which serves to operatively locate its associated hanger in said stripping station.

7. A device for removing meat hangers from meat such as bacon or the like, said meat hangers comprising a body portion having a suspension hook at one end thereof and a plurality of meat penetrating needles at the other end thereof, the meat penetrating needles being inclined with respect to the body portion in a penetrating direction towards said suspension hook, said device comprising:
 (a) a frame having a stripping station located thereon, a stripping path extending through said stripping station,
 (b) a platform mounted on said frame and having a front edge located at one side of said stripping path, said platform having a support surface which is inclined downwardly away from said front edge thereof.
 (c) a mounting finger on said frame and disposed outwardly from said front edge of said platform at the opposite side of said stripping path and above said platform, said mounting finger extending downwardly and rearwardly from said frame in an arcuate path and having a free end directed away from said stripping station over which suspension hooks of meat hangers may be removed to withdraw the meat hangers from the stripping station,
 (d) said platform and mounting finger cooperating with one another to support a hanger and its associated meat in the plane of said platform with the needles of the hanger directed upwardly in a second plane which extends through said stripping station,
 (e) a stripper member mounted above said stripping station to reciprocate with respect to said frame into and out of said stripping station in a third plane which extends parallel to said second plane to engage said hanger and push the needles out of the meat as it moves into said stripping station in said third plane,
 (f) stop means mounted on said frame and disposed below said first plane to receive said other end of said hanger and limit its downward movement,
 (g) drive means mounted on said frame for reciprocally driving said stripper member with respect to said frame.

8. A device as claimed in claim 7 wherein said frame has a hanger discharge passage opening rearwardly from said stripper station and a hanger stand comprising a base member, guide rod means projecting upwardly from said base member and having free ends disposed rearwardly from said discharge passage of said stripper station and aligned with passages in said hanger to be threaded through said passages when said hangers are discharged through said discharge passage whereby hangers may be stacked one on top of the other on said hanger stand.

9. A device as claimed in claim 8 wherein said base member is angularly inclined with respect to the vertical plane at an angle equal to half the included angle between the main body of the hanger and the needles.

10. A hanger storage stand for storing meat hanger of the type having penetrating needles projecting angularly from the main body thereof, comprising a base member and guide rods projecting upwardly from the base member, said guide rods being spaced from one another and extending parallel to one another to be threaded through the main body of the hangers, the base portion being angularly inclined with respect to the guide rods at an angle equal to half the included angle between the main body and needles of the hanger.

* * * * *